United States Patent [19]

Mouen-Makoua et al.

[11] Patent Number: 6,023,468
[45] Date of Patent: Feb. 8, 2000

[54] ATM CELL SPACING METHOD AND DEVICE THEREFOR

[75] Inventors: David Mouen-Makoua, Nanterre; Pierre Dumas, Sevres, both of France

[73] Assignee: Thomson-CSF, Paris, France

[21] Appl. No.: 09/147,002

[22] PCT Filed: Mar. 7, 1997

[86] PCT No.: PCT/FR97/00410

§ 371 Date: Sep. 8, 1998

§ 102(e) Date: Sep. 8, 1998

[87] PCT Pub. No.: WO97/33411

PCT Pub. Date: Sep. 12, 1997

[30] Foreign Application Priority Data

Mar. 8, 1998 [FR] France ................................ 96 02963

[51] Int. Cl.$^7$ ................................................ H04L 12/28
[52] U.S. Cl. ........................................................ 370/395
[58] Field of Search ........................... 370/229, 234, 370/235, 395, 396, 398, 412, 418, 397

[56] References Cited

U.S. PATENT DOCUMENTS

| | | | |
|---|---|---|---|
| 5,430,721 | 7/1995 | Dumas et al. | 370/395 |
| 5,450,225 | 9/1995 | Bostica et al. | 359/139 |
| 5,812,527 | 9/1998 | Kline et al. | 370/232 |
| 5,889,779 | 3/1999 | Lincoln | 370/398 |

*Primary Examiner*—Huy D. Vu
*Assistant Examiner*—Alexander Boakye
*Attorney, Agent, or Firm*—Oblon, Spivak, McClelland, Maier & Neustadt, P.C.

[57] ABSTRACT

A process for spacing ATM cells traveling through an ATM switch and emitted by ATM sources multiplexing diverse profiles destined for one or more networks of specified bit rate. First, the sources emitting cells destined for the same network are aggregated and given a standardized global CBR or VBR profile, the sources being assigned a specified priority. Next, the priorities of each of the sources are taken into account so as to allow specified qualities of service, and the sources are combined by multiplexing CBR and VBR profiles so as to obtain a source having a globally VBR or CBR profile, whilst also preserving the characteristics of the sources with CBR profile in the case of a globally VBR profile. Sharing the passband of the physical link supporting the streams of outgoing cells, between the VBR and CBR profiles, then takes place, and the remainder of the passband which is not used up by the above VBR and CBR profiles is allotted to so-called complementary sources of UBR profile. Lastly, sources with globally VBR or CBR profile are adopted to the bit rate of a specified physical link through which the outgoing cells must travel in order to access a specified network.

10 Claims, 5 Drawing Sheets

6,023,468

ATM CELL SPACING METHOD AND DEVICE THEREFOR

BACKGROUND OF THE INVENTION

1. Field of the Invention

The present invention relates to a process for spacing ATM cells multiplexing several traffic flows of varied profiles and relates also to a device for the implementation thereof.

The invention applies to the management of resources in ATM networks, and more precisely to the "shaping" of the traffic emitted by an ATM source.

2. Discussion of the Background

The source which injects cells into an ATM network may be an ATM user (UNI access, UNI standing for "User Network Interface") or a link-up point between two ATM networks (NNI, standing for "Network Network Interface" or PUNI, standing for "Public User Network Interface").

The sources shape the traffic which they emit under obligation to conform to a compliance contract based on a specific algorithm: the Virtual Spacing Algorithm or GCRA, standing for "Generic Cell Rate Algorithm", a definition of which is given by Recommendation I.371 of the ITU-T (International Telecommunications Union, Telecommunications Section).

With this algorithm it is possible to take two types of traffic profiles into account: traffic at constant bit rate CBR and traffic at variable bit rate VBR. It is based on two parameters: the peak bit rate and the average bit rate.

The peak bit rate is determined by the parameter PCR, standing for "Peak Cell Rate", expressed in cells per second and the average bit rate is determined by the parameters PCR and SCR, standing for "Sustainable Cell Rate", expressed in cells per second, and the parameter MBL, standing for "Maximum Burst Length", expressed in cells defining the maximum length of a burst of cells. The document 'A Spacer-Multiplexer for Public UNIs', P. Boyer & M. Servel, presented during an "ISS'95, World Telecommunications congress" congress, discloses a device which concentrates links emanating from users into a reduced number of high bit rate links directed towards a public network. At the user end, this device polices access and at the network end it carries out the shaping. The shaping function spaces the cells originating from the users with respect to the peak bit rate only. It does not take into account the various qualities of service such as CBR, VBR and UBR, standing for Undefined Bit Rate. The device is output-connected to a single network.

An ATM source multiplexes traffic flows of various kinds. Current solutions do not allow shaping of traffic flows of diverse kinds in order to make them comply with the contract negotiated with a destination network managing a standardized traffic profile. Standardized profiles are the profile with constant bit rate CBR and the profile with variable bit rate VBR.

The purpose of the present invention is to alleviate the aforementioned drawback.

SUMMARY OF THE INVENTION

To this end, the subject of the invention is a process for spacing ATM cells travelling through an ATM switch and emitted by ATM sources multiplexing diverse profiles destined for one or more networks of specified bit rate, characterized in that it consists:

in aggregating the sources emitting cells destined for the same network and in giving the sources a standardized global CBR or VBR profile, the sources being assigned a specified priority, in taking into account the priorities of each of the sources so as to allow specified qualities of service, in combining sources multiplexing CBR and VBR profiles so as to obtain a source having a globally VBR or CBR profile, whilst also preserving the characteristics of the sources with CBR profile in the case of a globally VBR profile, in sharing the passband of the physical link supporting the streams of outgoing cells, between the VBR and CBR profiles, and in allotting the remainder of the passband which is not used up by the above VBR and CBR profiles to so-called complementary sources of UBR profile, standing for Undefined Bit Rate, and in adapting the bit rate of the sources with globally VBR or CBR profile to the bit rate of a specified physical link through which the outgoing cells must travel in order to access a specified network.

The advantages of the invention are that it guarantees quality of service despite sources of lesser quality, and that it takes into account links with different profiles and different bit rates.

BRIEF DESCRIPTION OF THE DRAWINGS

Other advantages and characteristics of the present invention will emerge more clearly on reading the description which follows and the appended figures which represent.

DETAILED DESCRIPTION OF THE PREFERRED EMBODIMENTS

Figure 1:
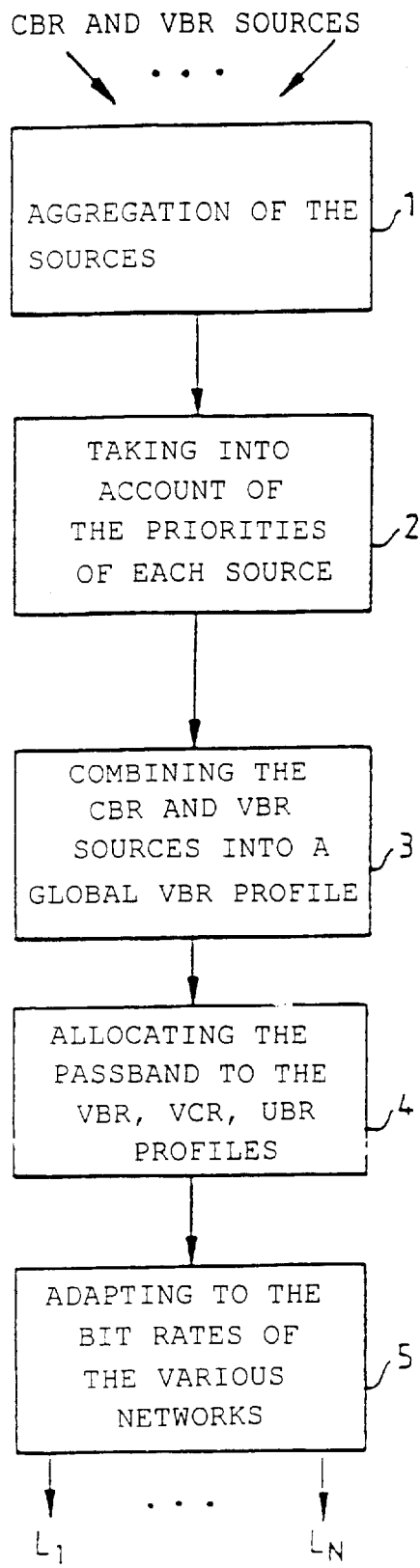
FIG. 1, the main steps of the process for spacing ATM cells according to the invention, FIG. 2, a diagram of the procedure for preserving the CBR component, FIG. 3, the principle for allocating the passband of a link to the various traffic flows CBR, VBR and UBR, FIG. 4, a functional diagram of a spacing device for implementing the process according to the invention, FIG. 5, the relations between the VBR, CBR and UBR components of a device according to the invention and the characteristics of the elementary spacing devices, FIG. 6A, a timing of bursts of cells to be avoided, FIG. 6B, a preferred timing of bursts of cells, FIG. 7, the schematic diagram of the CGRA algorithm according to Recommendation I.371 of the ITU-T, and FIG. 8, the three possible cases A, B and C of the CGRA algorithm, represented temporally.

The main steps of the process according to the invention are illustrated by the block diagram of FIG. 1.

The process according to the invention consists:

in a first step 1, in aggregating sources of different profile, by giving them a standardized CBR or VBR profile, in a second step 2, in taking into account the priorities of each of the sources so as to offer specified qualities of service, in a third step 3, in combining sources with CBR and VBR profile into a source having a global CBR or VBR profile whilst preserving the characteristics of the CBR sources, in the case of a global VBR profile, in a fourth step 4, in allotting a part of the passband not used by the CBR and VBR sources to complementary UBR sources, and in a fifth step 5, in adapting the various bit rates for accessing the networks receiving cells to the bit rates of the various sources emitting cells.

Figure 2:
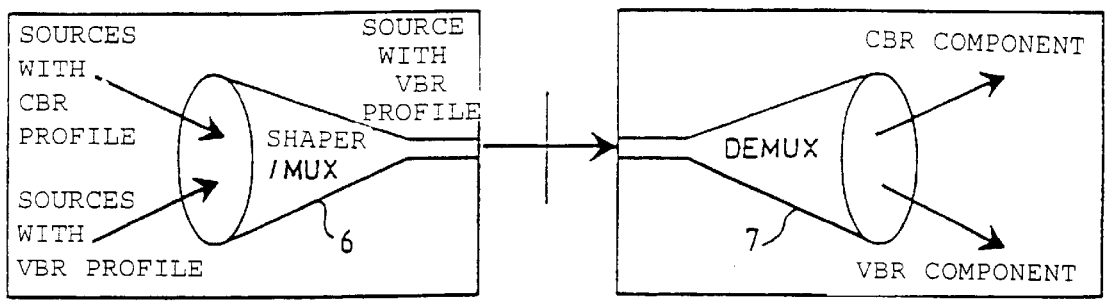

FIG. 2 diagrammatically illustrates the procedure for preserving the CBR component of the process according to the invention.

The sources of profile CBR and VBR respectively are combined or multiplexed and then shaped so as to make them comply with the contract negotiated with the destination network, according to either a VBR or a CBR standardized global profile. This dual shaping/multiplexing function is represented symbolically by the block SHAPER/MUX 6. Within the framework of a standardized VBR global profile, the process preserves the characteristics of the CBR components whilst ensuring VBR compliance. The DEMUX block 7 symbolizes a network to which the SHAPER/MUX 6 block is connected via its link-up point symbolized by a vertical stroke in FIG. 2.

Figure 3:
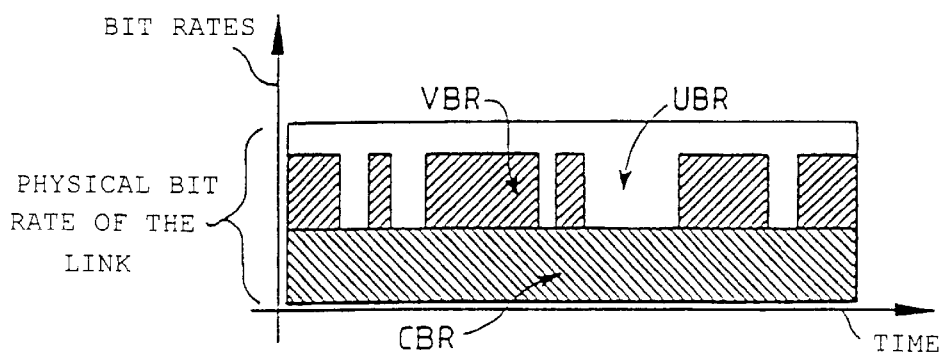

FIG. 3 illustrates the principle of allocating the passband of a link to the various traffic flows with profile CBR, VBR and UBR which take this link. This diagram represents the splitting up of the various bit rates over time within the physical bit rate of the link; the UBR traffic filling in the physical bit rate of the link left available by the CBR and VBR traffic flows.

Figure 4:
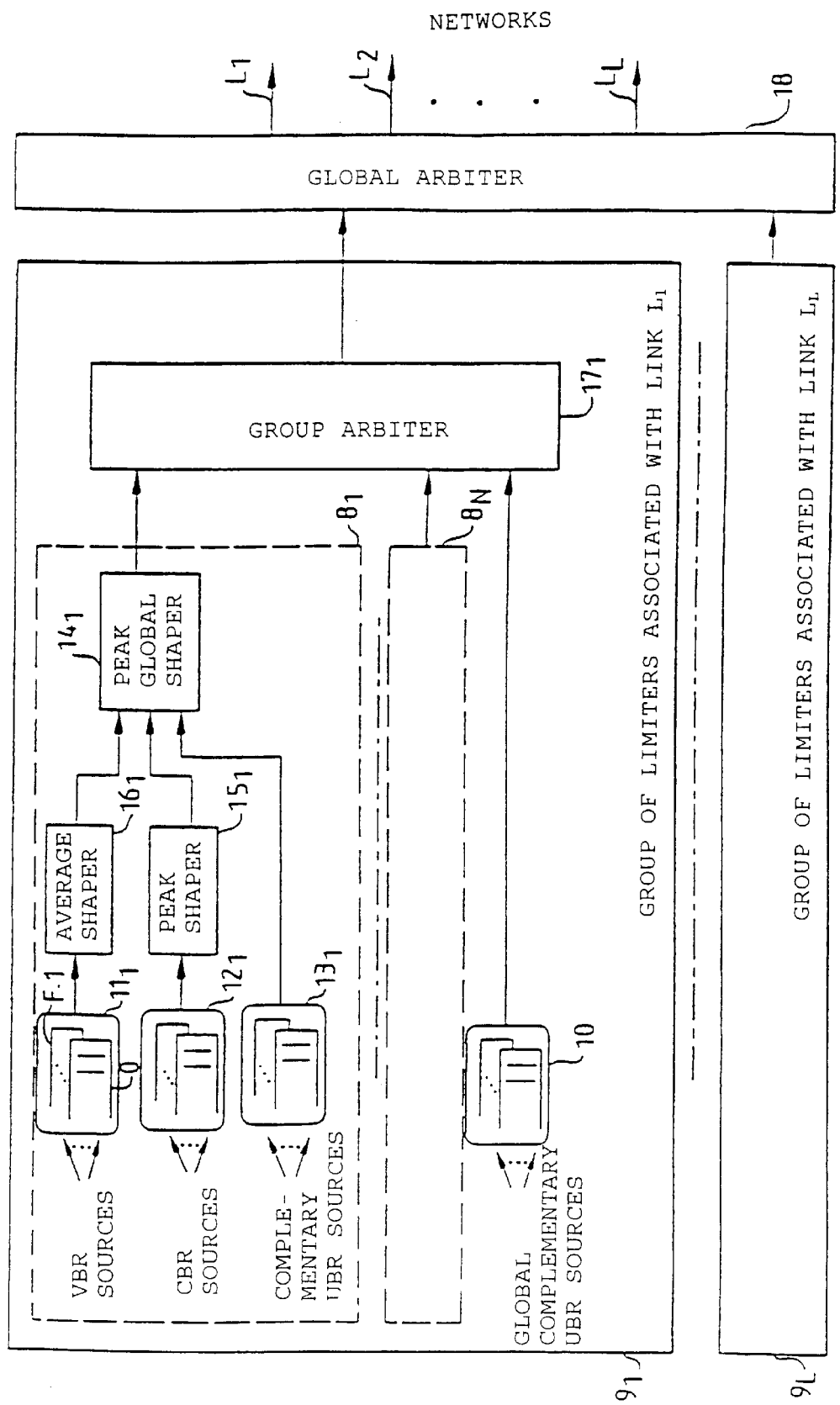

FIG. 4 illustrates a functional diagram of a device for spacing ATM cells for implementing the process according to the invention.

The device according to the invention comprises a specified number N of cell limiters $8_1$ to $8_N$, delimited by a discontinuous closed line. Each limiter $8_1$ to $8_N$ generates traffic with a standardized CBR or VBR profile and has at its disposal a passband shared between CBR and VBR sources. The passband which is not used by the CBR and VBR sources is used by the UBR sources.

Each limiter $8_1$ to $8_N$ is capable of combining the CBR and VBR sources into a globally CBR or VBR traffic. In the second case, it is capable of preserving the characteristics of the CBR components whilst ensuring VBR compliance.

The limiters which generate cells destined for the same network are aggregated into groups $9_i$, delimited by a heavy continuous closed line, with $1 \leq i \leq L$, L corresponding to the number of links and hence of networks connected to the device. Each group $9_1$ to $9_L$ of limiters is associated respectively, via its respective link $L_1$ to $L_L$, with a network of specified bit rate. The bit rates managed by the limiters $8_1$ to $8_N$ of each group $9_1$ to $9_L$ are adapted to the bit rates of the networks to which they are connected. At a group $9_1$ to $9_L$ of limiters $8_1$ to $8_N$, the residual passband is used by global UBR complementary sources whose cells are received by a set 10 of queues.

In each group $9_1$ to $9_L$, each limiter $8_1$ to $8_N$ sees the sources through sets of queues of ATM cells, $11_1$, $12_1$ and $13_1$ respectively. There are F queues in each set $11_1$, $12_1$ and $13_1$; each queue corresponding to a source. The queues are hierarchized according to a descending priority, by the limiters $8_1$ to $8_N$. Each queue bears a number, from 0 to F-1. Queue 0 is that of highest priority.

Each limiter $8_1$ to $8_N$ delivers ATM cells with a standardized VBR or CBR profile, the characteristics of which are expressed by three parameters PCRg, SCRg, MBLg (the index g signifying global). To be able to preserve the characteristics of the CBR components in the streams of outgoing cells of VBR profile, each limiter $8_1$ to $8_N$ comprises three elementary spacing devices or "shapers":

a first global PCR shaper $14_1$ controlled via the parameter PCRg which provides for the spacing with regard to the peak bit rate generated by the limiter $8_1$, a second PCR shaper $15_1$ controlled via the parameter PCRc which is used to generate the CBR component, and a third SCR shaper $16_1$ controlled via the parameter PCRv, SCRv, MBLv which is used to generate the VBR component.

The relations between the characteristics of these three shapers $14_1$, $15_1$, $16_1$ and those of the corresponding limiter $8_1$ are:

$$CRg = PCRc + PCRv$$

$$SCRg = PCRc + SCRv$$

$$MBLg = \frac{(MBLv - X)}{(1 - X)}, \text{ with } X = PCRc \cdot \left(\frac{1}{SCRg} - \frac{1}{PCRg}\right)$$

Figure 5:
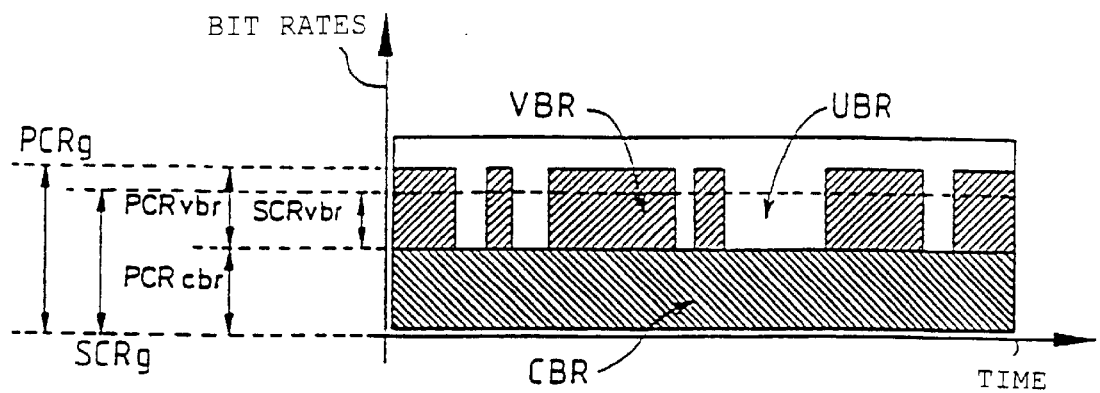

FIG. 5, based on FIG. 3, illustrates the relations between the VBR, CBR, UBR components of a limiter $8_1$ and the characteristics of the three shapers $14_1$, $15_1$ and $16_1$.

An arbitration algorithm is activated each time at least one destination link $L_1$ to $L_L$ is ready to receive a cell. This algorithm is implemented by one or more processors symbolized in FIG. 4 by a group arbiter block, $17_1$, coupled to the output of the limiters $8_1$ to $8_N$ of group $9_1$ and to the output of the set 10 of queues dedicated to the complementary UBR sources, and by a global arbiter block 18 coupled to the output of each group $9_1$ to $9_L$. These two types of blocks $17_1$ to $17_L$ and 18, respectively, make it possible to select a queue from which a cell will be extracted, from among all the queues managed by the limiters $8_1$ to $8_N$ of each group $9_1$ to $9_L$.

This algorithm comprises four steps detailed below:

In a first step, it consists in determining the queue 0 to F-1 to be served, for each of the sets $11_1$, $12_1$ and $13_1$ of queues F.

At the lowest level, that is to say for each set $11_1$, $12_1$ and $13_1$ of queues F, the queue to be served is the non-empty queue of highest priority.

In a second step, it consists in determining the eligible limiter $8_1$ to $8_N$, for each of the groups of limiters $9_1$ to $9_L$. The choice is made from among the limiters $8_1$ to $8_N$, fulfilling the following conditions:

The global PCR shaper $14_1$ is OK

<and> (the PCR shaper $15_1$ is OK <and> one of the queues CBR $12_1$ or VBR $11_1$ or UBR 10 is non-empty)

<or> (the SCR shaper $16_1$ is OK <and> one of the queues VBR $11_1$ or UBR 10 is non-empty)

<or> (one of the queues UBR 10 is non-empty).

When a "shaper" is said to be OK, this signifies that for this shaper a cell can be emitted.

If several limiters $8_1$ to $8_N$ fulfil these conditions, one of them is retained, either by fixed priority or by rotating priority.

In a third step, it consists in determining, from among the groups $9_1$ to $9_L$, that which will provide the next cell to be emitted. A group $9_1$ to $9_L$ is eligible if it fulfils the following two conditions:

the associated link (link $L_1$ to $L_L$) is capable of receiving a cell and the group $9_1$ to $9_L$ has a cell to be emitted, that is to say that one of the limiters $8_1$ to $8_N$ has been elected, or one of the complementary global UBR queues 10 of the group is non-empty. In the first case, the group is said to be eligible level 0, in the second it is said to be eligible level 1. Level 1 is of lower priority than level 0.

If several groups are eligible, one of them is retained, either by fixed priority or by rotating priority. The group elected uses the level of eligibility to select either one of the limiters 81 to 8N or one of the UBR queues 10.

In a fourth and last step, it consists in extracting and emitting a cell if a group has been retained. The plain language programming lines corresponding to this fourth step are given below.

```
/IF/the group is eligible level 1
/THEN/
    extract a cell from the set of complementary global UBR
        queues
/ELSE/
    for the limiter retained:
    /IF/the CBR shaper is OK
    /THEN/
    /IF/at least one of the CBR queues is non-empty
    /THEN/
        extract a CBR cell
    /ELSE IF/at least one of the CBR queues is non-empty
    /THEN/
        extract a VBR cell without affecting the resources of the VBR
            shaper
    /ELSE IF/at least one of the UBR queues is non-empty
    /THEN/
        extract a UBR cell
    /END IF/
/ELSE IF/the VBR shaper is OK
/THEN/
    /IF/at least one of the VBR queues is non-empty
    /THEN/
        extract a VBR cell, update the resources of the VBR shaper
    /ELSE IF/at least one of the UBR queues is non-empty
    /THEN/
        extract a UBR cell
    /END IF/
/ELSE/
    extract a UBR cell
    /END IF/
/END IF/
```

The PCR shapers $15_1$ intended for generating peak bit rates are embodied using timing devices referred to hereafter as "timers". The loading value of the timer, that is to say the countdown time interval, is equal to the period of the CBR stream to be generated, i.e. 1/PCR.

Two options for restarting the timer after the end of the countdown hereinafter referred to as "timeout" are possible: either the timer is restarted immediately after the timeout, or it is restarted when a cell is actually extracted from the shaper.

Figure 6A:
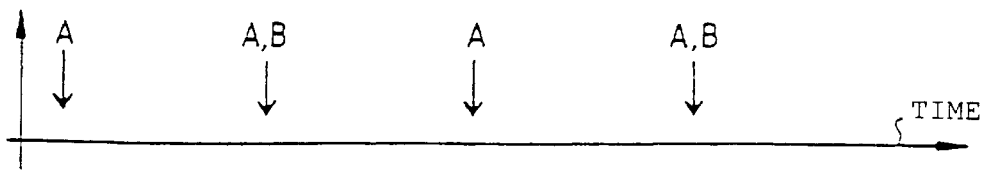
Figure 6B:
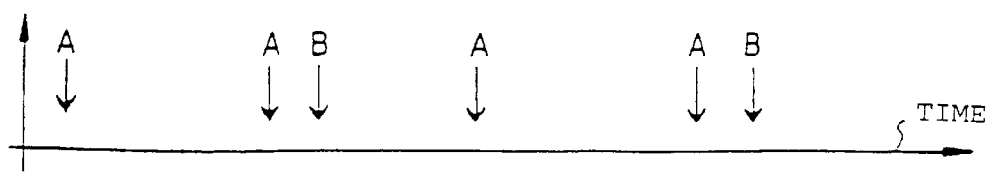

FIG. 6A illustrates a timing to be avoided and FIG. 6B the preferred timing.

To limit the bursts A, B in the timeout over several PCR shapers operating simultaneously at frequencies in integer ratios, the bursts are advantageously out of phase as illustrated in FIG. 6B.

The SCR shapers $16_1$ intended for generating average bit rates are embodied using the GCRA algorithm. The latter is illustrated by the schematic diagram of FIG. 7.

Figure 7:
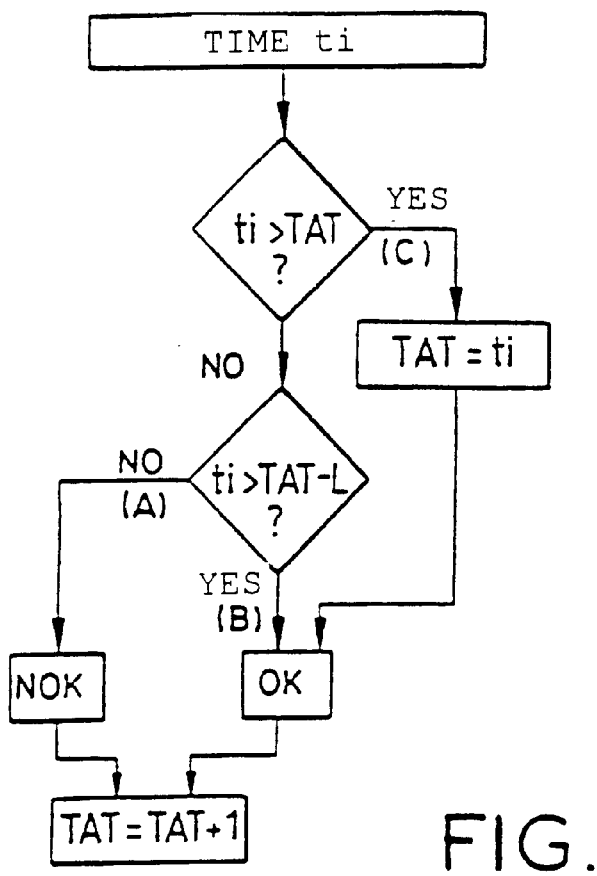
Figure 8:
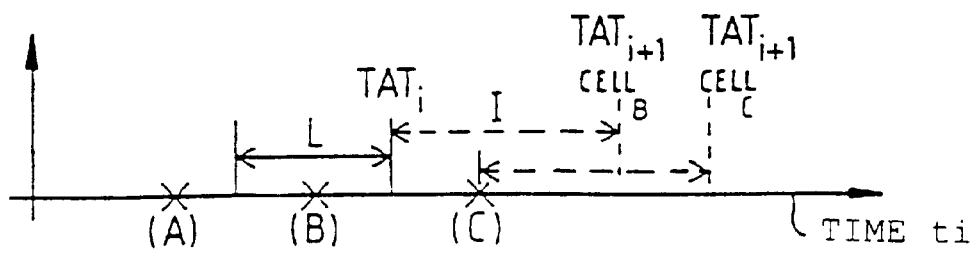

This algorithm is represented temporally by the diagram of FIG. 8 which depicts three possible cases of instants of arrival of the cells, these instants being labelled A, B and C in FIGS. 7 and 8.

In this algorithm, a reference value is defined, called $TAT_i$ standing for "Theoretical Arrival Time", and in which ti corresponds to a current value of the instant of arrival of a cell. With this theoretical arrival time $TAT_i$ there is associated a tolerance range or limit L. In the case corresponding to the instant of arrival A, the cell arrives before $TAT_i$ and is additionally outside the limit L. In this case, the cell is rejected.

In the case corresponding to the theoretical instant of arrival B, the cell arrives before the instant $TAT_i$ but within the tolerance range L. It is therefore regarded as complying and is therefore retained. The algorithm then calculates the theoretical arrival time of the next cell, that is to say the incrementation parameter I. The new theoretical arrival time then being written $TAT_{i+1}=TAT_i+I$ and the algorithm then waits for a new cell.

In the case corresponding to the instant of arrival C, the cell arrives after the theoretical arrival time $TAT_i$ and outside the tolerance range L.

The following theoretical arrival time will then be calculated not starting from the theoretical time $TAT_i$ but rather starting from the instant of arrival C. In the latter case, an offset occurs.

The values of the limit L and of the increment I are calculated from the parameters PCRv, SCRv and MLBv corresponding to the VBR profile according to the following relations:

$$I_{SCR} = \frac{1}{SCRv}$$

$$L_{SCR} = (MBLv - 1) \cdot \left(\frac{1}{SCRv} - \frac{1}{PCRv}\right)$$

We claim:

1. Process for spacing ATM cells travelling through an ATM switch and emitted by ATM sources multiplexing diverse profiles destined for one or more networks of specified bit rate, characterized in that it consists:

in aggregating the sources emitting cells destined for the same network and in giving the sources a standardized global profile of the type with constant bit rate CBR or of the type with variable bit rate VBR, the sources being assigned a specified priority, in taking into account the priorities of each of the sources so as to allow specified qualities of service, in combining sources multiplexing CBR and VBR profiles so as to obtain a source having a globally VBR or CBR profile, whilst also preserving the characteristics of the sources with CBR profile in the case of a globally VBR profile, in sharing the passband of the physical link supporting the streams of outgoing cells, between the VBR and CBR profiles, and in allotting the remainder of the passband which is not used up by the above VBR and CBR profiles to so-called complementary sources of undefined bit rate profile UBR, and in adapting the bit rate of the sources with globally VBR or CBR profile to the bit rate of a specified physical link through which the outgoing cells must travel in order to access a specified network.

2. Device for spacing ATM cells for implementing the process according to claim 1, characterized in that it comprises a specified number of groups of limiters, dependent on the number of physical links supporting exchanges of cells between the spacing device and networks of diverse bit rates to which it is connected, each group grouping together a specified number of limiters serving the same network, each limiter comprising:

a first set of queues receiving cells emitted by sources of VBR profile, a second set of queues receiving cells emitted by sources of CBR profile, a third set of queues receiving cells emitted by complementary sources of UBR profile, a first elementary device for spacing the mean bit rate coupled to the output of the first set of queues, a second elementary device for spacing the mean bit rate coupled to the output of the second set of queues, a third elementary device for the global spacing of the peak bit rate coupled to the output of the first and second elementary spacing devices, and to the output of the third set of queues;

each limiter having a passband shared between the sources of CBR and VBR profile, the passband which is not used by the sources of CBR and VBR profile being used by the complementary sources of UBR profile, and in that each group comprises:

a fourth set of queues receiving cells emitted by global complementary sources of UBR profile, and an arbitration block coupled to the output of the limiters and of the fourth set of queues, and in that the spacing device comprises a global arbitration block coupled to the output of the arbitration blocks of each group of limiters, the outputs of the global arbitration block being coupled respectively to the physical links with the networks.

3. Device according to claim 2, characterized in that the arbitration blocks of each group of limiters and the global arbitration block implement an arbitration algorithm consisting in selecting a specified queue from among all the queues as soon as a physical link is ready to receive a cell so as to allow the bit rate of the sources of globally VBR or CBR profile to be adapted to the bit rate of the destination physical link.

4. Device according to claim 2, characterized in that the first elementary device for spacing the mean bit rate is based on the virtual spacing algorithm.

5. Device according to claims 2, characterized in that the second elementary device for spacing the peak bit rate is based on a counter whose loading value is equal to the period of the stream of cells emitted according to a CBR profile.

6. Device according to claim 5, characterized in that the counter is restarted after the end of the countdown of the loading value.

7. Device according to claim 5, characterized in that the counter is restarted when a cell is actually extracted from the second elementary spacing device.

8. Device according to claim 3, characterized in that the first elementary device for spacing the mean bit rate is based on the virtual spacing algorithm.

9. Device according to claim 3, characterized in that the second elementary device for spacing the peak bit rate is based on a counter whose loading value is equal to the period of the stream of cells emitted according to a CBR profile.

10. Device according to claim 4, characterized in that the second elementary device for spacing the peak bit rate is based on a counter whose loading value is equal to the period of the stream of cells emitted according to a CBR profile.

* * * * *